March 30, 1954 F. D. WALDHAUER 2,673,935

PHOTOCELL-AMPLIFIER CIRCUIT

Filed Oct. 26, 1951

INVENTOR.
Fred D. Waldhauer
BY Carl R. Gochau
ATTORNEY.

Patented Mar. 30, 1954

2,673,935

UNITED STATES PATENT OFFICE 2,673,935

PHOTOCELL-AMPLIFIER CIRCUIT

Fred D. Waldhauer, Philadelphia, Pa., assignor to Radio Corporation of America, a corporation of Delaware Application October 26, 1951, Serial No. 253,285

7 Claims. (Cl. 250—210)

This invention relates to amplifier circuits, and particularly to a connecting circuit between an amplifier and a photoelectric cell housed in equipment such as motion picture sound projectors.

When photoelectric cell amplifiers are enclosed within a motion picture projector case and the amplifier is conductively coupled to a power line, the negative return of the amplifier may be at a dangerous voltage relative to ground. Consequently, this negative return cannot be connected to any metallic member of the equipment which is exposed or accessible to an operator. If the photoelectric cell is housed in an exposed metal part of the machine, the metal surrounding the cell will be at some alternating voltage relative to the negative return of the photoelectric cell. Since some capacitance exists between this surrounding metal and the photoelectric cell, and since some voltage will exist between the negative return and the surrounding metal, a current is caused to flow through this capacitance and to the input to the amplifier to constitute a source of noise.

The problem has been solved in the past by placing an inaccessible metallic shield around the photoelectric cell and connecting it to the negative return of the amplifier, which eliminates the longitudinal voltage before it becomes a metallic circuit voltage. This solution of the problem, however, requires that the shield be insulated for line voltage from the exposed metal parts, and, as the shield takes up considerable room, this solution may not be a practical one in many instances.

The present invention is directed to circuit connections which will produce a neutralizing voltage on the first stage of the amplifier to neutralize the noise voltage in the input circuit.

The principal object of the invention, therefore, is to facilitate the amplification of voltages detected by a photoelectric cell.

Another object of the invention is to provide an improved connecting circuit between a photoelectric cell and an amplifier used in an exposed housing.

A further object of the invention is to provide an improved connecting circuit between a photoelectric cell and an amplifier which eliminates a photoelectric shield by generating noise neutralizing voltages.

Figure 1:
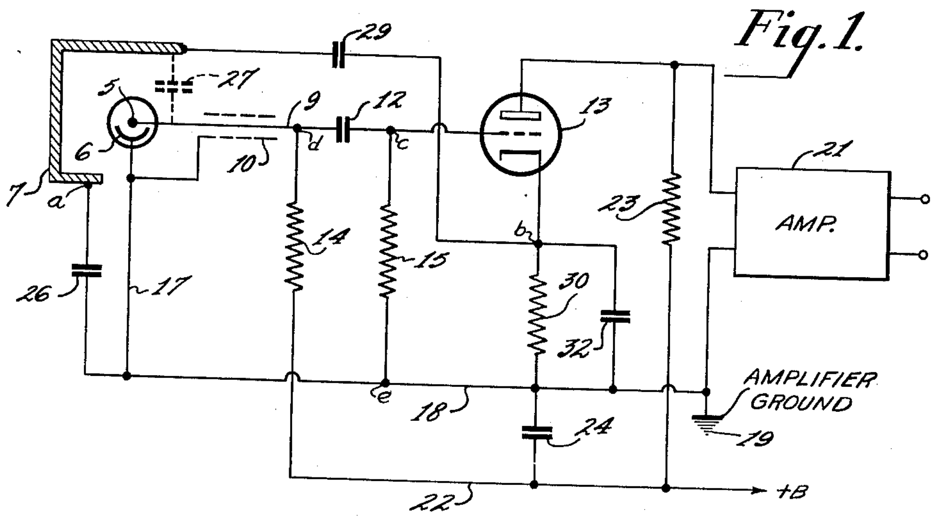
Figure 2:
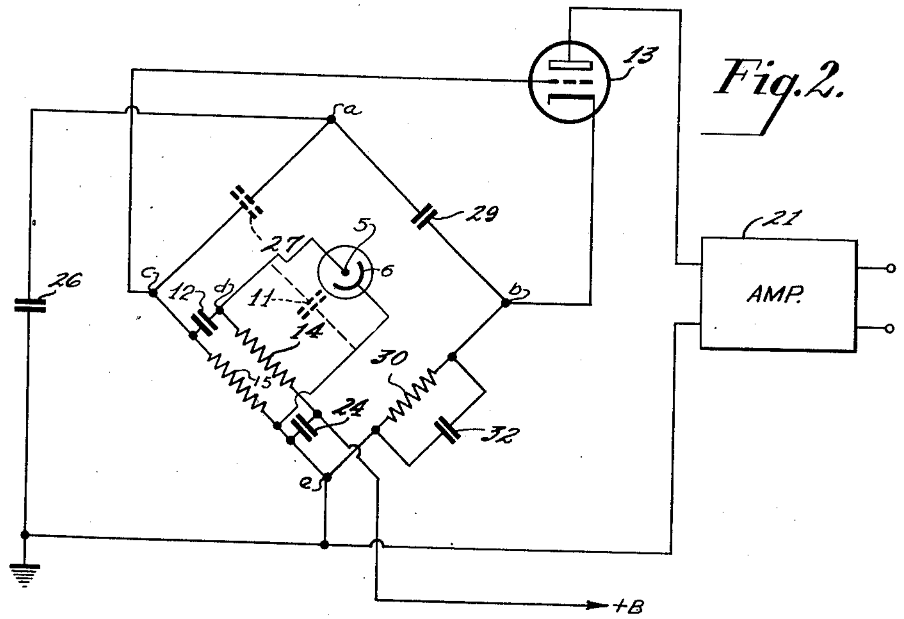

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a schematic circuit of the connecting circuit embodying the invention, and Fig. 2 is a schematic drawing illustrating the bridge arrangement of the circuit of Fig. 1.

Referring now to the drawings, a photoelectric cell having an anode 5 and a cathode 6 is shown housed within a projector case or housing 7. The photoelectric cell is shown connected over a conductor 9 through a shield 10 and over a coupling condenser 12 to the grid of the first amplifier tube 13. Polarizing potential is supplied over resistor 14 and conductor 22 from the plus B terminal, while the amplifier grid return is over resistor 15.

The cathode 6 of the photoelectric cell is connected over conductor 17 and conductor 18 to the amplifier ground 19, the output of the amplifier 13 being connected to additional amplifiers 21 in any standard manner. Anode potential for the anode of tube 13 is from the plus B terminal over resistor 23, the usual by-pass condenser 24 being provided.

Between the projector case 7 and the amplifier ground is the condenser 26. There will be a current flowing through the condenser 26, which current is fed by capacity and leakage from the power line. This voltage is impressed upon the photoelectric cell through the stray capacity 27 (shown by dashed lines), which gives rise to a noise current which flows through the input grid resistor 15, the polarizing load resistor 14, and the photoelectric cell in parallel. The photoelectric cell resistance is much higher in value than the other two components of the amplifier input impedance, and, consequently, may be neglected. However, the current flowing through the grid resistor 15 causes a noise voltage to appear on the grid of the amplifier tube 13. Now, by connecting a condenser 29 of the proper value between the projector case 7 and the cathode of the amplifier tube 13, a current of the same wave form is caused to flow through the cathode resistor 30 of the tube 13. By proper selection of condenser 29, the voltage appearing across the resistor 30 is made equal to the voltage on the grid of the amplifier tube and serves to neutralize the noise voltage appearing thereon. Thus, the use of condenser 29 eliminates the necessity of an isolating shield around the photoelectric cell 5—6.

In Fig. 2, the bridge arrangement of Fig. 1 is illustrated, showing that condenser 29 makes up one arm of the bridge and the stray capacity 27 another arm of the bridge. Thus, a balanced alternating current bridge is provided for the currents flowing through condenser 26.

In amplifiers of this type, a noise voltage may be generated between the grid and cathode caused by harmonics of the power line frequency and some signal frequencies, the latter being due to the fact that the secondary of the output transformer is connected to the projector case, which causes capacity unbalance from either side of the primary to the secondary of the output transformer. This will cause some signal voltage to be impressed between the projector case and the amplifier negative return. Unless balance of the input circuit noise bridge is maintained to high frequencies, some of this voltage is impressed between the grid and cathode of the input amplifier tube, causing regeneration and oscillation. The photoelectric cell signal is fed over conductor 9 in a shield 10, there being appreciable capacity between the conductor and the surrounding shield. This comprises a shunting reactance 11 (drawn in dashed lines, see Fig. 2) across that arm of the bridge which consists of the input grid resistor 15 and the polarizing load resistor 14 in parallel. There is some attenuation of both the signal and the noise voltage at high frequencies because of this shunting reactance. There is no such attenuation of the balancing noise voltage being fed to the cathode of tube 13, and consequently, any high frequency voltage which may exist between the projector case and negative return will, in part, be impressed between the grid and cathode of the amplifier tube 13. By introducing a signal attenuation in the balancing voltage circuit, a balance may be maintained to high frequencies. This attenuation is accomplished by connecting a condenser 32 from the cathode of tube 13 to the negative return 19 of the amplifier. This capacitor raises the high frequency response, reduces high frequency noise, and maintains the amplifier stable.

The above circuit, therefore, provides, by the simple addition of two condensers, a complete neutralization of noise creating voltages without the use of an expensive isolated shield around the photoelectric cell.

I claim:

1. A connecting circuit between a photoelectric cell having an anode and cathode and an amplifier tube having an anode and cathode and grid, comprising a source of voltage, a coupling condenser connected between the anode of said cell and the grid of said tube, a polarizing resistor connected between the anode of said cell and said voltage source, a grid resistor connected between the grid of said tube and ground, a cathode resistor connected between the cathode of said tube and ground, a housing for said photoelectric cell, a condenser connected between said housing and the terminals of said grid resistor and said cathode resistor connected to ground, and a condenser connected between said housing and said cathode resistor.

2. A connecting circuit in accordance with claim 1, in which a condenser is provided in shunt to said cathode resistor.

3. A connecting circuit between a photoelectric cell having an anode and cathode and an amplifier tube having an anode and cathode and grid, comprising means for connecting said anode of said cell to said grid of said tube, a housing for said cell, and a bridge circuit having one arm including the stray capacitance between said housing and said anode of said cell, a second arm including a condenser between said housing and said cathode of said tube, a third arm including a cathode resistor for said tube, and a fourth arm including a polarizing resistor for said cell, a grid resistor for said tube, and said cell in parallel.

4. A connecting circuit in accordance with claim 3, in which a condenser is connected in parallel with said cathode resistor for said tube.

5. A noise neutralizing circuit between a photoelectric cell having an anode and cathode and an amplifier tube having an anode, cathode, and grid comprising a casing, a polarizing resistor for said photoelectric cell, a grid resistor for said amplifier tube, and a bridge circuit having one arm including the stray capacitance between the anode of said photoelectric cell and said casing, another arm including capacitance between said casing and the cathode of said amplifier tube, a third arm including resistance between the cathode of said amplifier tube and the cathode of said photoelectric cell shunted by a capacitance, and a fourth arm including said photoelectric cell, said grid resistor, and said polarizing resistor in parallel.

6. A noise neutralizing circuit in accordance with claim 5, in which connecting means are provided between the anode of said photoelectric cell and the grid of said amplifier, together with a shield for said connecting means, said fourth arm of said bridge including the capacitance between said connecting means and said shield.

7. A connecting circuit comprising a photoelectric cell having an anode and cathode, an amplifier tube having an anode, cathode, and grid, connecting means between the anode of said photoelectric cell and the grid of said amplifier tube, and a shield for said connecting means, stray capacitance existing between said connecting means and shield, a housing for said photoelectric cell, stray capacitance existing between said housing and the anode of said photoelectric cell, a bridge circuit having one arm including said second mentioned stray capacitance, a second arm including a condenser between said housing and said cathode of said tube, a third arm including a cathode resistor for said tube, and a fourth arm including a polarizing resistor for said cell, a grid resistor for said tube, and said cell in parallel, and means connected to the cathode of said amplifier tube and the cathode of said photoelectric cell for balancing said first mentioned stray capacitance.

FRED D. WALDHAUER.

References Cited in the file of this patent

UNITED STATES PATENTS

| Number | Name | Date |
|---|---|---|
| 2,193,590 | Gulliksen | Mar. 12, 1940 |
| 2,294,377 | Bierwirth | Sept. 1, 1942 |
| 2,295,536 | Alberscheim | Sept. 15, 1942 |